Nov. 20, 1923.

C. A. ROBERTSON

SEPARATOR BOWL CONSTRUCTION

Filed Dec. 15, 1921

Witness:

Inventor:
Charles A. Robertson

Nov. 20, 1923.    1,474,379
C. A. ROBERTSON
SEPARATOR BOWL CONSTRUCTION
Filed Dec. 15, 1921    2 Sheets-Sheet 2
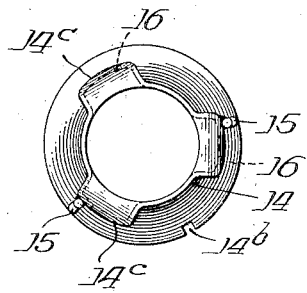
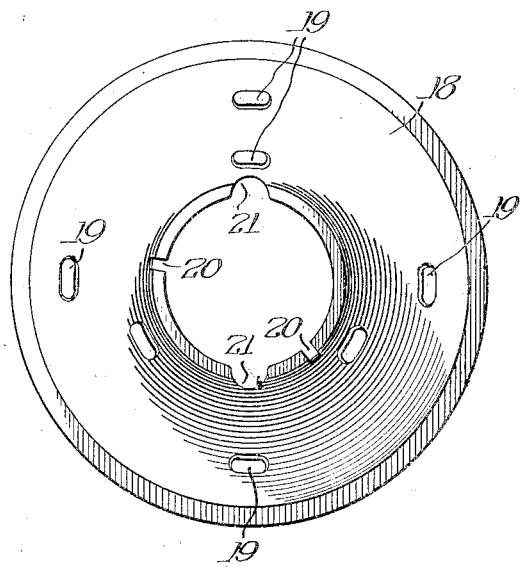
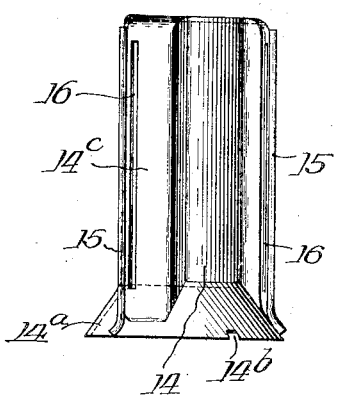
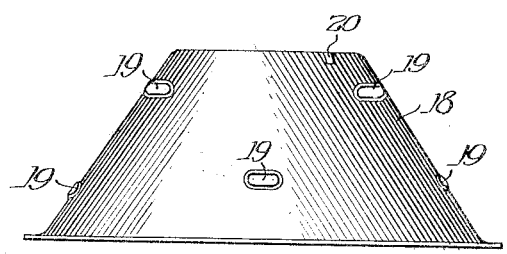
Inventor:
Charles A. Robertson Patented Nov. 20, 1923.

1,474,379

UNITED STATES PATENT OFFICE.

CHARLES A. ROBERTSON, OF SPRINGFIELD, ILLINOIS, ASSIGNOR TO MONTGOMERY WARD & CO., INC., OF CHICAGO, ILLINOIS, A CORPORATION OF ILLINOIS.

SEPARATOR-BOWL CONSTRUCTION.

Application filed December 15, 1921. Serial No. 522,675.

*To all whom it may concern:*

Be it known that I, CHARLES A. ROBERTSON, a citizen of the United States, residing at Springfield, in the county of Sangamon and State of Illinois, have invented certain new and useful Improvements in a Separator-Bowl Construction, of which the following is a specification.

This invention relates generally to liquid separators, and particularly to improvements in the construction of centrifugal separators designed for separating the components of milk.

The general purpose of the invention is the simplification of the construction of such devices for the purpose of reducing cost, providing a bowl which may be more readily disassembled and re-assembled for the purpose of the necessary cleaning, and one which obviates to the greatest possible degree the deposit or accumulation thereon of butter fat or other constituents of the liquid treated.

A more specific object of the invention is the provision of an improved disk as an element of such a device.

Another particular object of the invention is the provision of an improved separator bowl construction which will obtain improved results in the direction of rapidity and accuracy in the separation of constituents of the treated liquid.

Other and further objects of the invention will be pointed out hereinafter, indicated in the appended claims, or will be obvious upon an understanding of the present disclosure.

In the accompanying drawings forming a part of this specification I have shown one form in which the invention may be embodied, but it is to be understood that the same is here presented for the purpose of illustration merely and that the structure is susceptible of variation and modification without departing from the essential features of the invention.

In the drawings—

Fig. 3 is a top view of one type of disk;

Fig. 4 is a side view of the same type of disk;

Fig. 5 is a top view of the bowl core; and

Fig. 6 is a side view of the bowl core.

Figure 1:
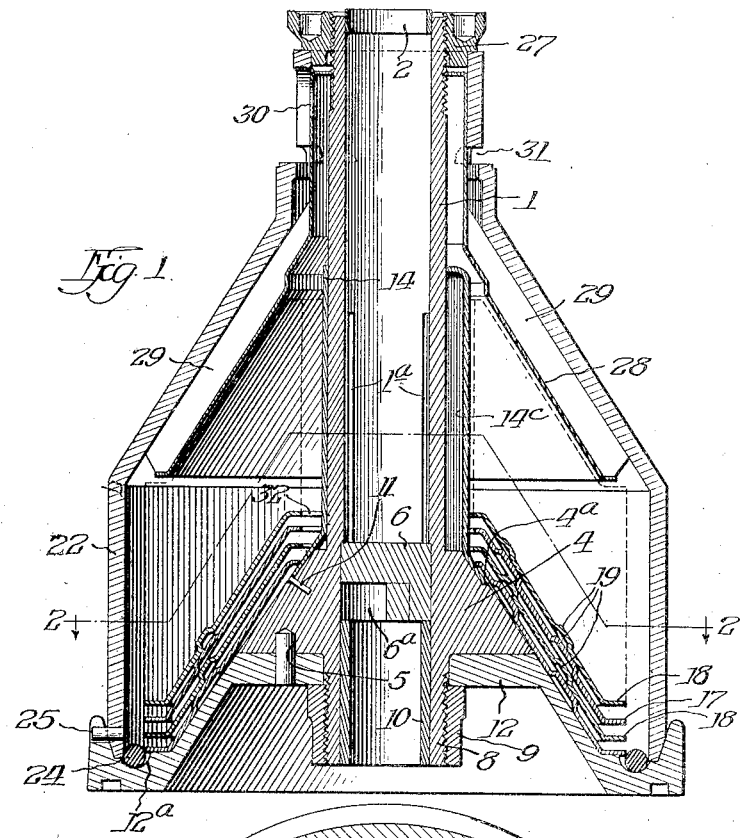
Fig. 1 is a longitudinal section through my improved separator bowl, the same being taken on a diameter thereof.

The nature of the invention will best be understood by reference to these drawings in detail, from which it will be understood that the numeral 1 designates the milk column portion of the bowl shaft, said portion being of cylindrical tubular form and being provided with longitudinally extending narrow slots $1^a$ of which there are three. The upper outer portion of the shaft 1 is screw-threaded and into the upper end is pressed a steel bushing 2. The lower extremity of the column 1 terminates at and is integral with a frusto-conical base 4 formed with a step or shouldered portion $4^a$ and with a pin seat 5 indented from its bottom face. The longitudinal bore of the tubular member 1 is closed by a plug 6 which is pressed into the same to form a liquid tight joint and suitably retained. This plug forms a closure for the bore of the tubular column member at the lower extremities of the slots $1^a$. The plug 6 is slotted out to form a retaining seat $6^a$ for the bowl spindle. Below the foot member 4 the shaft continues as a tubular extension 8 which is externally screw threaded for reception of a clamping nut 9, while a bronze bushing 10 is pressed into the tubular extension to a point where its upper end contacts the lower face of the plug 6. Seated in the foot member 4 so as to protrude at the step or shouldered portion $4^a$ is a positioning pin 11. The shaft just described is adapted to be seated on the upper extremity of the bowl spindle of the separator actuating mechanism in the customary fashion, said spindle having a terminal lug which is adapted to fit in the seat $6^a$ to secure the shaft to the spindle for rotation thereby. The bowl base 12 is a circular pressed member having an annular upwardly opening groove $12^a$ adjacent its periphery, and an upwardly extending lug adapted to fit in the seat 5 to retain the base for rotation with the core. The base is secured in place on the column by means of the clamping nut 9 which clamps it against the lower face of the foot 4.

Figure 2:
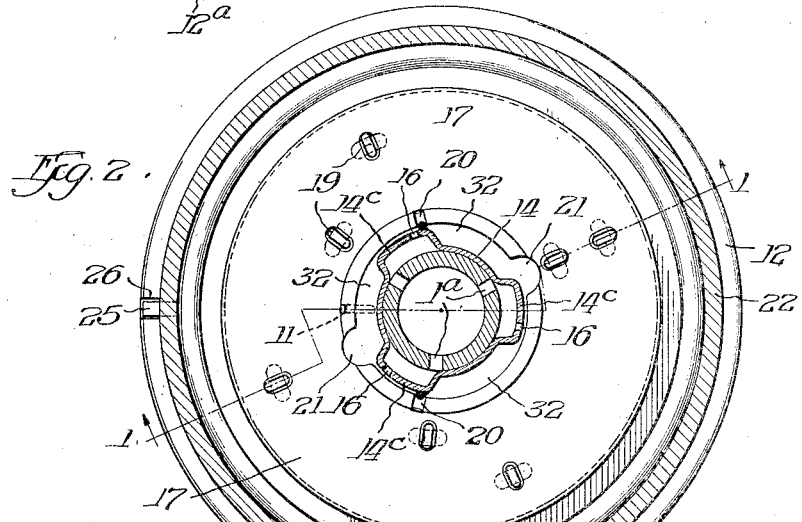
Fig. 2 is a cross-section of the milk column taken on substantially the line 2—2 of Fig. 1.

Upon the tubular column 1 is mounted the bowl core 14, the construction of which is illustrated in Figs. 5 and 6. The design of this member is such that it may be pressed out of sheet metal in general tubular form with a body portion adapted to fit concentrically upon the tubular member 1, and a flaring base portion 14ª adapted to fit upon the upper portion of the foot member 4 and seat with its lower margin in the step 4ª. This flaring base portion is provided with a notch 14ᵇ arranged to receive the protruding portion of the pin 11, whereby the core is retained for rotation with the shaft. As best illustrated in Fig. 6, the tubular body portion of the core member has radially projecting lugs 14ᶜ extending longitudinally thereof from the flaring portion 14ª to the other extremity of the member. Certain of these lugs are provided with outwardly extending longitudinal ribs 15 which may be pressed, or formed by soldering a wire along one margin of the lugs. These lugs, furthermore, are provided with longitudinal slots 16 in their outer faces, said slots being disposed to one side of the median line of the lugs. The arrangement of the core upon the column 1, as determined by the location of the pin 11 and notch 14ᵇ, is such that the slots 16 are offset from the slots 1ª, in the fashion illustrated in Fig. 2. The core 14 affords a retentive mounting for the separator disks. These disks which are illustrated in Figs. 1, 3 and 4 are bowl shaped members with concentric axial openings. There are two types of these disks, the disks of one type being designated by the numeral 17 and the disks of the other type by the numeral 18, and illustrated respectively in Figs. 2 and 3. These disks may be formed from suitable sheet metal by pressing operations which shape them with peripheral flanges, disk spacing embossments 19, positioning notches 20 and flow notches 21, the disks are of identical form, being of frusto-conical shape with central apertures sufficient to permit their passage over the core 14 when the positioning notches 20 are so placed as to receive the positioning ribs 15. The spacing embossments 19 are formed as slightly upstruck protuberances in the sloping portions of the disks without severing them at any point from the body of the metal in which they are formed. The arrangement of these spacing embossments is such that those on any disk will overlie the embossments on all of the disks below it when the disks are nested on the core 14. There are two forms of these disks, the respective forms differing only in the form of these embossments. In a complete set of thirty three disks, the odd numbered disks, (17 in all) are embossed so that the long axis of each embossment is parallel to the contour element of the disk, as illustrated in Fig. 3. While in the sixteen even numbered disks the embossments are arranged with their longitudinal axes at a ninety degree angle to the longitudinal axes of the correspondingly placed embossments on the odd numbered disks. The spotting of these embossments is such that the center lines of correspondingly placed embossments coincide on all of the disks. As a result, when the disks are nested upon the core, the odd and even numbered disks being placed thereon alternately, the embossments will be effective to space the surfaces of juxtaposed disks apart by the height of the embossments, affording narrow flow spaces for movement of liquid between them, and, due to the center spotting of all of the embossments, they will afford supporting columns throughout the entire series of disks. These spacing embossments are preferably arranged in two series which are at different radial distances from the centers of the disks. The location of the inner series is such that the embossments will overlie the frusto-conical foot portion 4, while the location of the outer series is such that the embossments therein will overlie a portion of the base plate 12. The embossments 19 are formed with sloping sides which merge into the surface contour of the disks with a curved bend, rather than with an angular junction, thereby eliminating crevices at these points which ordinarily gather deposits from the liquid handled and are difficult to clean.

The bowl shell 22 is a hollow member of part frusto-conical and part cylindrical form and seats at its larger extremity in the groove of the base member 12, packing 24 being arranged to form a liquid tight joint, and a pin 25 fixed in the shell being seated in a notch 26 in the rim of the base member 12, to maintain the two against relative rotation. The upper extremity of the bowl shell extends as a neck alongside the column member 1, and is secured to the upper end of said member by means of a nut 27 screw seated on the latter and engaging the upper marginal portion of the shell to space it from the column and to press the shell member against the base plate. The shell member, in conjunction with the base plate 12 and column 1 enclose the disks and the core member, with a clearance between the inner wall of the shell and the margins of the disks and between the shell and the column member 1. Above the uppermost disk of the series is imposed the cream cone 28, the lower portion of which is flaring so as to fit over the uppermost disk, and the upper portion of which is tubular so as to encompass the column member 1 with a clearance between the two. Fins 29 disposed at intervals about the sloping portion of the cream cone constitute spacers which contact the inner wall of the bowl shell and press the cone down into contact with the disks, serving also to space the cone away from the bowl shell. The upper portion of the cream cone is provided with a cream outlet 30 which discharges through an aperture in the neck of the bowl shell, while the space between the bowl shell and the cream cone communicates with a skimmed milk outlet 31 through the neck of the former.

The operation of the device is similar to that of separators of this general type, the bowl being mounted upon the spindle and rotated at a high speed, the unseparated liquid is fed into the bore of the column 1, whence it finds outlet through the slots 1ª into the distribution columns afforded by the internal form of the core lugs 14ᶜ. From these distribution columns the liquid finds exit through the slots 16 to the space between the disks. Under the action of centrifugal force the heavier constituents of the liquid are moved outwardly between the disks and the lighter constituents displaced inwardly. The latter rise through the spaces 32 between the series of disks and the core member and through the neck of the cream cone, whence they are discharged through the outlet 30. The heavier constituents of the liquid rise in the space between the peripheries of the disks and the bowl shell, and on the exterior of the cream cone 28 until they find outlet through the aperture 31.

The construction above described contains many advantages which contribute to economy in the production of the apparatus. All of the parts may be constructed without the use of solder, which is of material advantage from the standpoint of durability and from the standpoint of cleanliness, due to the fact that soldered connections frequently become leaky and permit the ingress of liquid to places where it cannot be readily cleaned out. The construction of the spacing elements for the disks provides continuous supporting columns between the base plate 12 and the cream cone 28 through which the compression from the latter is exerted to maintain the disks in proper relationship. At the same time the zones of contact between the superposed disks are such as not to interfere with the movement of the constituents of the liquid induced by the operation of the device. The actual areas in contact are much less than in constructions heretofore, affording additional space for the movement of the liquid constituents. The form of the core, and the association of the core slots 16 with the slots 1ª of the milk column are such as to effect a distribution of the unseparated liquid throughout the entire height of the series of disks so that all of the intervening spaces are supplied and the device may operate at maximum efficiency at all times. The rotary movement of the bowl causes the liquid in the distribution channels to tend to bank up against the rearward radial walls of the ribs 14ᶜ. Consequently, by disposing the outlet slots 16 adjacent these walls the discharge of the liquid from the distribution channels is facilitated, and no closed spaces are afforded wherein milk might be pocketed. The base plate, disks, core, cream cone and shell all may be made by pressing operations, leaving the bowl shaft and the nuts as the only parts requiring lathe work. The structure is readily dismantled for cleaning, rendering all parts thereof easily accessible.

I claim:

1. In a device of the class described the combination of a tubular shaft member having a foot portion of frusto-conical form adjacent one extremity thereof, the wall of said member being provided with longitudinal slots above said foot portion, a base plate secured against the under face of said foot portion, a tubular core member encompassing the slotted part of said shaft member and having a flaring lower extremity adapted to fit on the foot portion, said core member affording lateral apertures for egress of fluid, a series of disks of frusto-conical form encompassing said core member and disposed in superposed relationship with the lower disks of the series encompassing said foot portion, said disks being spaced apart so as to afford passage of fluid therebetween, and a shell cooperating with said base plate to enclose said disks.

2. In a device of the class described the combination of a tubular shaft member having a frusto-conical foot portion, a base plate secured against the lower face of said foot portion, said shaft being provided with lateral apertures above said foot portion, a tubular core member encompassing the apertured portion of said shaft and having a flared lower part fitting upon said foot portion, said core member affording vertical channels communicating with the lateral apertures in the shaft, said core member being provided with lateral apertures offset circumferentially from the apertures of the shaft and affording outlet from said channels, a series of disks of frusto-conical form encompassing said core member, said disks being arranged in superposed relationship with spaces therebetween communicating with the outlet apertures of the core member, the lowermost disk of the series contacting said foot portion of the shaft, superposed disks having limited areas of contact with subjacent disks, a shell cooperating with said shaft and base plate to enclose the disks and core, and spacing means cooperating with said shell to transmit pressure through the series of disks to said foot portion.

3. In a device of the class described the combination of a tubular shaft member, said member being provided with lateral apertures, a tubular core member encompassing the apertured portion of said shaft member, said core member affording longitudinal channels communicating with the apertures of the shaft member, said shaft and core members being connected for rotation together, the channel portions of said core member being provided with longitudinal slots forming lateral apertures which are offset circumferentially from the shaft apertures, and a plurality of superposed disks encompassing said core member with spaces between them communicating with said apertures in the core member.

4. In a device of the class described the combination of a tubular central member provided with lateral outlets, a core member encompassing said central member over said outlets, said core member providing longitudinal distribution channels communicating with said outlets and having lateral walls extending away from said central member, said core member being provided with longitudinal slots forming outlets from said distribution channels, which outlets are disposed adjacent certain of said side walls.

5. In a device of the class described the combination of a tubular central member and a tubular core member encompassing the same, said core member being shaped to provide longitudinal distribution channels extending alongside said central member, the lateral wall portions of which extend away from the wall of the central member, said central member being provided with outlets discharging into said distribution channel adjacent certain of said side walls, and said core member being provided with discharge outlets communicating with said distribution channels adjacent others of said side walls.

In testimony whereof I have hereunto signed my name.

CHARLES A. ROBERTSON.